US007664239B2

(12) United States Patent
Groff et al.

(10) Patent No.: US 7,664,239 B2
(45) Date of Patent: Feb. 16, 2010

(54) METHODS AND COMPUTER-READABLE MEDIA FOR MANAGING AND CONFIGURING OPTIONS FOR THE REAL-TIME NOTIFICATION AND DISPOSITION OF VOICE SERVICES IN A CABLE SERVICES NETWORK

(75) Inventors: Vincent Groff, Dunwoody, GA (US); Steven J. Calzone, Duluth, GA (US); Constantine Gavrilidis, Atlanta, GA (US); Varun Dada, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 721 days.

(21) Appl. No.: 11/199,352

(22) Filed: Aug. 8, 2005

(65) Prior Publication Data

US 2006/0031904 A1 Feb. 9, 2006

Related U.S. Application Data

(60) Provisional application No. 60/599,958, filed on Aug. 9, 2004.

(51) Int. Cl.
*H04M 11/00* (2006.01)
(52) U.S. Cl. ............... 379/93.17; 379/93.23; 379/90.01; 725/106
(58) Field of Classification Search ............... 379/93.17, 379/93.23, 93.12, 90.01, 102.01, 102.02, 379/102.03, 142.16, 88.17, 88.11, 88.18; 725/106
See application file for complete search history.

(56) References Cited

U.S. PATENT DOCUMENTS

| 5,623,537 | A | 4/1997 | Ensor et al. ................. 379/88.2 |
| 5,629,978 | A | 5/1997 | Blumhardt et al. ........... 370/271 |
| 5,805,682 | A * | 9/1998 | Voit et al. ............... 379/142.16 |
| 6,707,893 | B1 | 3/2004 | Basore et al. ............. 379/93.23 |
| 6,882,709 | B1 * | 4/2005 | Sherlock et al. ........... 379/90.01 |
| 6,971,120 | B1 * | 11/2005 | Sheekookian ................ 725/106 |
| 7,277,445 | B2 * | 10/2007 | Bartfeld et al. ......... 379/142.17 |
| 7,356,137 | B1 | 4/2008 | Burg et al. .............. 379/211.01 |
| 2002/0033416 | A1 * | 3/2002 | Gerszberg et al. ........... 235/380 |
| 2006/0085832 | A1 * | 4/2006 | Groff et al. .................. 725/106 |

OTHER PUBLICATIONS

USPTO Office Action having U.S. Appl. No. 11/247,058 dated May 26, 2009 (10 pages).

* cited by examiner

*Primary Examiner*—Stella L Woo
(74) *Attorney, Agent, or Firm*—Merchant & Gould (57) ABSTRACT

Methods are provided for managing and configuring voice services the notification and disposition of voice services, such as telephone calls, in a cable television services system. In response to receiving a notification of an incoming voice service in the cable television services system, a voice services banner is generated for displaying options for managing the incoming voice service. Options for managing the incoming voice service are selected from the voice services banner. An on-screen user interface is generated for configuring voice services options on a display device in communication with a set-top box. The user interface receives selections for configuring the voice services options. In response to receiving a selection, a determination is made whether to display a menu for configuring the voice services options based on a subscriber profile. If it is determined that the configuration of voice services is authorized, then the menu is displayed for configuring the voice services options.

17 Claims, 8 Drawing Sheets

METHODS AND COMPUTER-READABLE MEDIA FOR MANAGING AND CONFIGURING OPTIONS FOR THE REAL-TIME NOTIFICATION AND DISPOSITION OF VOICE SERVICES IN A CABLE SERVICES NETWORK

CROSS-REFERENCE TO RELATED APPLICATIONS

This patent application claims the benefit of U.S. Provisional Patent Application No. 60/599,958 entitled "Voice Services Via a Television Services System," filed on Aug. 9, 2004 and expressly incorporated herein by reference.

BACKGROUND OF THE INVENTION

With the advent of cable services networks, cable subscribers have grown accustomed to receiving a variety of television programming from numerous broadcasting sources. In recent years, technology advances have enabled subscribers to receive an even greater variety of products and services through cable services networks. Modern cable services networks provide traditional video television programming, telephone services, high speed internet access, electronic mail services, video-on-demand, information services, and the like. Through the use of set-top boxes (computing systems), cable services providers can provide interactive television services to subscribers. Such interactive television services allow customers to interact directly with services providers in response to services and product offerings presented to the subscribers through their television sets. For example, in some current cable services networks, subscribers are able to use a set-top box to access a dedicated screen for viewing a call log of missed calls made to a subscriber telephone number.

Unfortunately, current systems do not offer real-time management of telephone calls (e.g., answering calls, forwarding calls, etc.) made to a subscriber telephone number nor are they capable of displaying notifications of incoming calls while a subscriber is viewing television. Because current systems do not offer real-time notification and disposition of telephone calls, a subscriber may miss desired telephone calls. It is with respect to these and other considerations that the present invention has been made.

BRIEF SUMMARY OF THE INVENTION

In accordance with the present invention, the above and other problems are solved by methods for managing and configuring options for the real-time notification and disposition of voice services in a cable services network. The methods enable a subscriber to configure options for receiving real-time notification of incoming telephone calls on a display device connected to a set-top box as well as disposition instructions for managing incoming telephone calls.

According to one aspect of the invention, a method is provided for managing voice services, such as telephone calls, in a cable television services system. The method includes, in response to receiving a notification of an incoming voice service in the cable television services system, generating a voice services banner for displaying options for managing the incoming voice service and receiving a selection of one of the options displayed in the voice services banner for managing the incoming voice service.

According to another aspect of the invention, a method is provided for configuring the management of voice services in a cable television services system. The method includes generating an on-screen user interface for configuring voice services options on a display device in communication with a set-top box in the cable television services system and receiving in the user interface a selection for configuring the voice services options. In response to receiving the selection, the method further includes determining whether to display a menu for configuring the voice services options based on a subscriber profile. If, based on the subscriber profile, it is determined that the configuration of voice services is authorized, then the method includes displaying a menu for configuring the voice services options.

Various other aspects of the invention may be implemented as a computer process, a computing system, or as an article of manufacture such as a computer program product or computer readable media. The computer program product may be a computer storage media readable by a computer system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
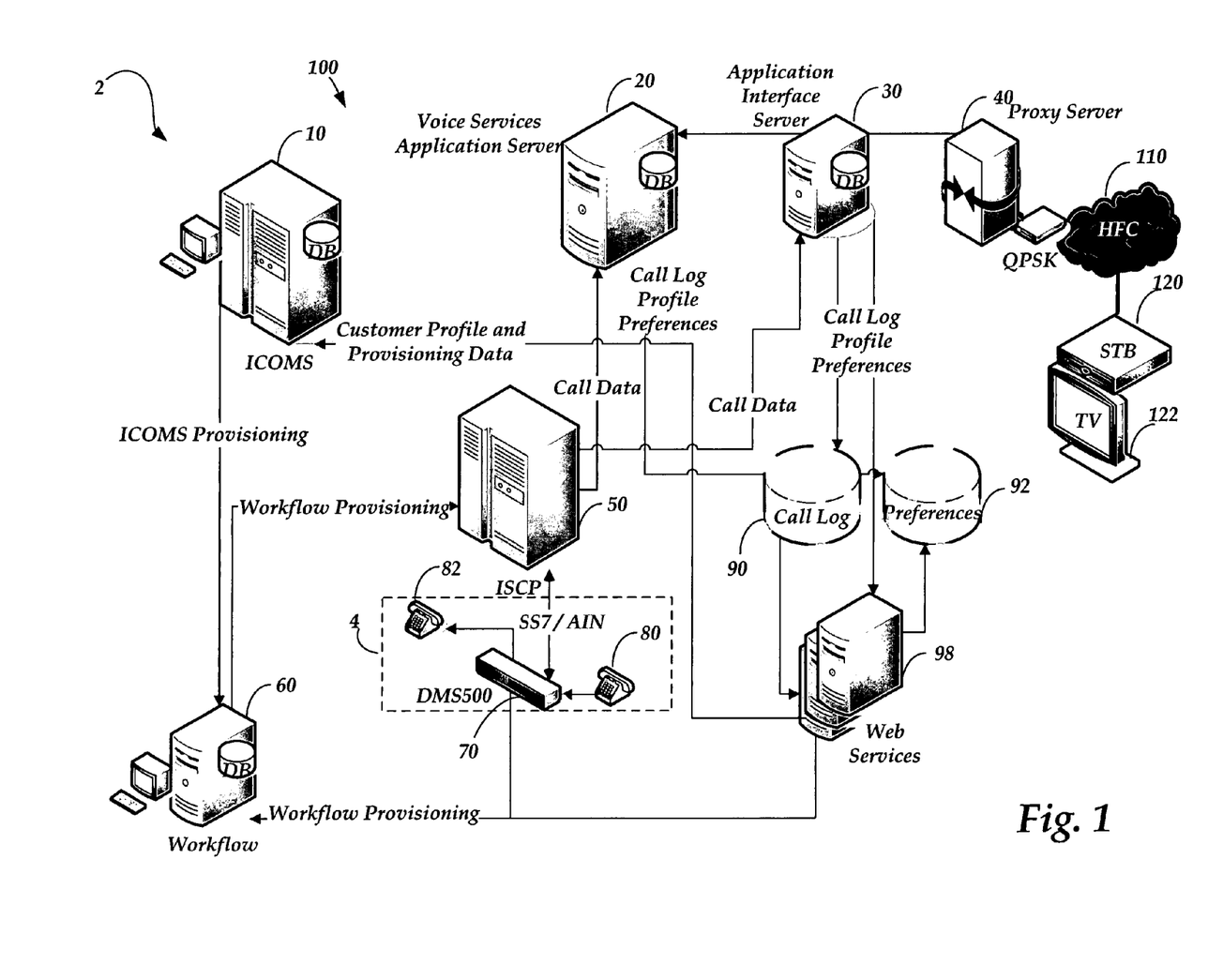
FIG. 1 is a diagram illustrating a cable services network architecture that serves as an illustrative operating environment for the present invention.

Referring now to the drawings, in which like numerals represent like elements, various embodiments of the present invention will be described. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. According to an actual embodiment, the present invention is implemented in a cable television/services system in communication with one or more telecommunications sources. FIG. 1 is a block diagram illustrating a cable television/services system architecture 2 (hereinafter referred to as "CATV" system 2) that serves as an illustrative operating environment for the present invention.

Referring now to FIG. 1, digital and analog video programming, information content and interactive television services are provided via a hybrid fiber coax ("HFC") network 110 to a television set 122 for consumption by a cable television/services system customer. As is known to those skilled in the art, HFC network 110 combines both optical fiber and coaxial cable lines. Typically, optical fiber runs from the cable head end 100 to neighborhoods of 500 to 2,000 customers. Coaxial cable runs from the optical fiber feeders to each customer. According to embodiments of the present invention, the functionality of the HFC network 110 allows for efficient bidirectional data flow between client-side set-top box ("STB") 120 and voice and messaging application server 20 (hereinafter referred to as voice services application server 20) of the present invention.

According to illustrative embodiments of the present invention, the CATV system 2 is in the form of a distributed client-server computing system for providing video and data flow across the HFC network 110 between server-side services providers (e.g., cable television/services providers) via a server-side head end 2 and a client-side customer via client-side STB 120 functionally connected to a customer receiving device, such as the television set 122. As is understood by those skilled in the art, modern CATV systems 2 may provide a variety of services across the HFC network 115 including traditional digital and analog video programming, telephone services, high speed Internet access, video-on-demand, and information services.

The head end 100 of the CATV system 2 is positioned on the server side of the CATV system and includes hardware and software systems responsible for originating and managing content for distribution through the HFC network 110 to client-side STB 120 for presentation to one or more customers via television 122. As discussed above, a number of services may be provided by the CATV system 100, including digital and analog video programming, interactive television services, telephone services, video-on-demand services, targeted advertising, and provision of information content.

In order to provide telephone services, the head end 100 of the CATV system 2 includes an Intelligent Service Control Point ("ISCP") 50. As is known to those skilled in the art, the ISCP 50 acts as an interface with one or more telecommunications sources (such as telecommunications network 4) to enable the deployment of telephone services in the CATV system 2. An illustrative ISCP system which may be utilized by the various embodiments of the invention is the ISCP SYSTEM manufactured by TELCORDIA TECHNOLOGIES, INC. of Piscataway, N.J.

The telecommunications network 4 may include an advanced intelligent network ("AIN") which is currently utilized by the public switched telephone network. As is known to those skilled in the art, the AIN includes various components which use the Signaling System 7 ("SS7") network for signal or system control message transport. The operation of many of the components of the AIN intelligent network is described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

The components of the telecommunications network 4 include a service switching point or switch such as the DMS500 switch 70 which may be utilized for connecting voice channel circuits, including voice channel lines, to telephones 80 and 82 used for initiating and receiving telephone calls. It will be appreciated by those skilled in the art that, according to the various illustrative embodiments of the invention, the switch 70 may also be in communication with a mobile switching center (not shown) for providing wireless communications in the telecommunications network 4.

In operation, the switch 70 may communicate with the ISCP 50 via digital data messages transmitted over a network of digital data links. The switch 70 may be configured to interface with the ISCP 50 through the use of a trigger. A trigger in the network is an event associated with a particular subscriber line or call that causes the switch 70 to generate a data packet message to be sent to the ISCP 50. In the various illustrative embodiments of the invention, the switch 70 activates a termination attempt trigger ("TAT") for each subscriber line authorized for voice services provided by the voice services application server 20.

Referring again to the head end 100 of the CATV system 2, the voice services application server 20 is a general-purpose computing system operative to assemble and manage data sent to and received from the STB 120 via the HFC network 110, for providing voice services on the television 122, including, but not limited to, TV caller ID functionality with real-time call management including call notification and call disposition services (such as call answer and call forwarding) and TV call logs. The head end 100 also includes an Integrated Communications Operations Management System ("ICOMS") which is a general-purpose computing system for integrating customer profile and provisioning data for customer accounts between the voice services application server 20, the ISCP 50, and the switch 70.

The head end 100 also includes a workflow system 60, which is a general-purpose computing system operative to automatically provision network elements for providing voice services in the CATV system 2. Through the workflow system 60, the switch 70 may be provisioned to activate the TAT trigger on each subscriber telephone line authorized to receive television voice services. The ISCP 50 may be provisioned with account information for each provisioned subscriber telephone line including a voicemail number, an address for the voice services application server 20 (the address may be associated with a dialing prefix range such as NPA-NXX), and default subscriber preferences (e.g., whether the subscriber only wishes to be notified of incoming calls or wishes notification and disposition services). Finally, the voice services application server 20 may be provisioned with basic account information for each provisioned subscriber account including an account number, each telephone number associated with an account, the names associated with each telephone number associated with an account, STB IDs associated with each account, an internet protocol ("IP") address for each STB associated with an account (it will be appreciated that the IP address is assigned in real time when the STB boots up), voice services settings and preferences for each account, and call forwarding numbers for each account.

The head end 100 also includes an application interface server 30 in communication with the voice services application server 20, the ISCP 50, and Call Log and Preferences databases 90 and 92. The Call Log database 90 includes data for calls made to a telephone number associated with a subscriber account. The call log data may include the time and date a telephone call to a subscriber was received, the telephone number of the calling party, and the name of the calling party (i.e., Caller ID). The Preferences database 92 includes subscriber preferences for television voice services for a subscriber's account. As discussed above, these preferences may include whether the subscriber wishes to be notified of incoming calls only or wishes notification and disposition services. The application interface server 30 is a general-purpose computing system operative to assemble and manage data sent between the STB 120 and the voice services application server 20. For example, the application server 30 may obtain Caller ID data for an incoming telephone call to a subscriber from the voice services application server 20 and forward the Caller ID data to the television 122 via the HFC network 110 and the STB 120.

The web services system 98 is in communication with the ICOMS 10, the application interface server 30, the Call Log and Preferences databases 90 and 92, and the workflow system 60. In accordance with illustrative embodiments of the invention, the web services system 60 may serve as a collection point for data requested from the ICOMS 10 and the workflow system 60. For example, when the application interface server 30 requires customer profile and provisioning data from the ICOMS 10 or the workflow system 60 for preparation or update of a customer profile, the application interface server 30 passes a data query to the web services system 98. The web services system 98 formulates a data query to each of the available data services systems 10 and 60 for obtaining any available data for a given customer as identified by a STB identification associated with the customer. Thus, the web services system 98 serves as an abstraction layer between the data services systems 10 and 60 and the application interface server 30. That is, the application interface server 30 is not required to communicate with the disparate data services systems 10 and 60, nor is the application interface server 30 required to understand the data structures or data types utilized by the disparate data services systems 10 and 60. The head end 100 in the CATV system 2 also includes a proxy server 40 for intercepting requests from the STB 120 communicated over the HFC network 110.

On the client side of the CATV system 2, digital and analog video programming and digital and analog data (including Caller ID data related to incoming telephone calls) are provided to the television 122 via the STB 120. Interactive television services that allow a customer to input data to the CATV system 2 likewise are provided by the STB 120. As illustrated in FIG. 1, the STB 120 is a multipurpose computing device having a computer processor, memory and an input/output mechanism. The input/output mechanism receives input from server-side processes via the HFC network 110 and from customers via input devices such as a remote control device or a keyboard (not shown). The input devices may communicate with the STB 120 via a suitable communication transport such as an infrared connection. The STB 120 also includes a video processor for processing and providing digital and analog video signaling to the television 122 via a cable communication transport. A multi-channel tuner is provided for processing video and data to and from the STB 120 and the server-side head end system 100, described above.

The STB 120 also includes an operating system for directing the functions of the STB 120 in conjunction with a variety of client applications. In accordance with the illustrative embodiments of the present invention, the STB 120 includes a client application for displaying voice services data (i.e., caller ID data) as well as notification and disposition options for managing incoming telephone calls in real-time. The client application in the STB 120 is also configured for generating user interfaces and menus for configuring the management of incoming voice services (i.e., telephone calls). The set-top box 120 passes digital and analog video and data signaling to the television 122 via a one-way communication transport. The STB 120 may receive video and data from the server side of the CATV system 2 via the HFC network 110 through a video/data downlink and data via a data downlink. The STB 120 may transmit data from the client side of the CATV system 2 to the server side of the CATV system 2 via the HFC network 110 via one data uplink. The video/data downlink is an "in band" downlink that allows for digital and analog video and data signaling from the server side of the CATV system 2 through the HFC network 110 to the STB 120 for use by the STB 120 and for distribution to the television 122. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink between the HFC network 110 and the STB 120 comprise "out of band" data links. As is understand by those skilled in the art, the "out of band" frequency range generally lies between zero and 54 megahertz. According to illustrative embodiments of the present invention, data flow between the STB 120 and the server-side components of the head end 100 is typically passed through the "out of band" data links. Alternatively, an "in band" data carousel may be positioned in an "in band" channel into which a data feed may be processed from the components of the head end 100 through the HFC network 110 to the STB 120. Operation of data transport between components of the CATV system 2, described with reference to FIG. 1, is well known to those skilled in the art.

Figure 2:
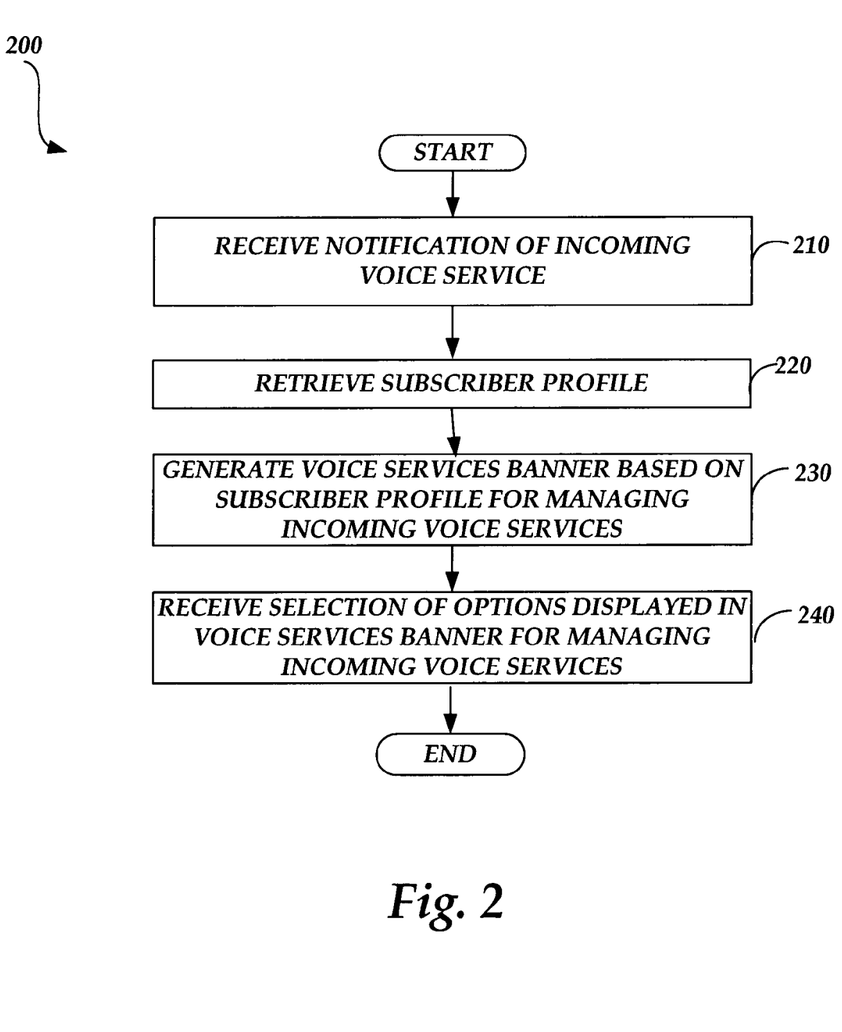
FIG. 2 is a flow diagram showing an illustrative routine for managing voice services in a cable television services system.

Referring now to FIG. 2, an illustrative routine 200 will be described for managing voice services in the CATV system 2. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 2-3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 2, the routine 200 begins at operation 210, wherein a notification of an incoming voice service (i.e., a telephone call) is received in the head end 100 from a telecommunications source in the CATV system 2 and communicated to the STB 120. In particular, the voice services application server 20 receives a notification of an incoming voice service from a telecommunications source such as the telecommunications network 4 of FIG. 1. For instance, a telephone call from the telephone 80 to a subscriber in the CATV system 2 may be routed to the switch 70. The switch 70 then routes the telephone call to the subscriber to the ISCP 50. The ISCP 50 then routes the telephone call, call data (i.e., Caller ID data), and other data associated with the telephone call (such as a subscriber account number) to the voice services application server 20. As discussed above with respect to FIG. 1, each subscriber telephone line authorized for television voice services in the CATV system 2 has a termination attempt trigger (TAT) activated in the switch 70. In response to the TAT, the switch 70 generates a data packet message which is sent to the ISCP 50 utilizing SS7 links in the telecommunications network 4.

The routine 200 continues from operation 210 at operation 220 where the STB 120 retrieves a subscriber profile from the head end 100 of the CATV system 2. In particular, the STB 120 may be configured to request the voice services application server 20 to retrieve subscriber profile data for a subscriber account. In particular, the voice services application server 20 may retrieve the subscriber profile data from the Preferences database 92. The subscriber profile data may include a selection of notification and disposition options to be displayed on a subscriber STB for incoming telephone calls. For example, a subscriber profile may indicate that only a notification banner for displaying missed (i.e., unanswered) calls to a subscriber is to be displayed by a subscriber STB while another subscriber profile may indicate that a disposition banner for displaying incoming telephone calls and options for accepting, forwarding, or sending calls to voice mail is to be displayed by the subscriber STB.

The routine 200 continues from operation 220 at operation 230 where the STB 120 generates a voice services banner based on the retrieved subscriber profile for managing incoming voice services. In particular, the STB 120 may be programmed to generate the voice services banner (e.g., a disposition banner) within the boundaries of a full screen television program (including video and audio playback) being broadcast on the television 122. The STB 120 may generate the voice services banner by requesting and receiving call data (i.e., Caller ID data) from the voice services application server 20 which is assembled into a data message by the proxy server 40. In accordance with an illustrative embodiment of the invention, the voice services banner includes a user interface which allows a subscriber to select from among multiple disposition options (e.g., "answer," "forward," or "send to voicemail") for managing incoming voice services. An illustrative television screen display showing a voice services banner in accordance with an embodiment of the invention will be described below with respect to FIG. 4.

The routine 200 continues from operation 230 at operation 240 where a selection of the options displayed in voice services banner is received in the user interface generated by the STB 120 for managing the incoming voice service. For instance, a subscriber may select an option for sending an incoming voice service to voice mail upon viewing the voice services banner. The routine 200 then ends.

It will be appreciated that once an option has been selected for managing an incoming voice service, the STB 120 sends a disposition instruction for processing the incoming voice service to the voice services application server 20. Upon receiving the disposition instruction from the STB 120, the voice services application server 20 sends the disposition instruction for processing the incoming voice service to the telecommunications source (i.e., the telecommunications network 4). In particular, the disposition instruction may be sent from the voice services application server 20 to the ISCP 50, which in turn, communicates the disposition instruction to the switch 70. The switch 70 then routes the telephone call according to the disposition instruction received from the ISCP 50 (e.g., the telephone call is forwarded to another telephone number).

Figure 3:
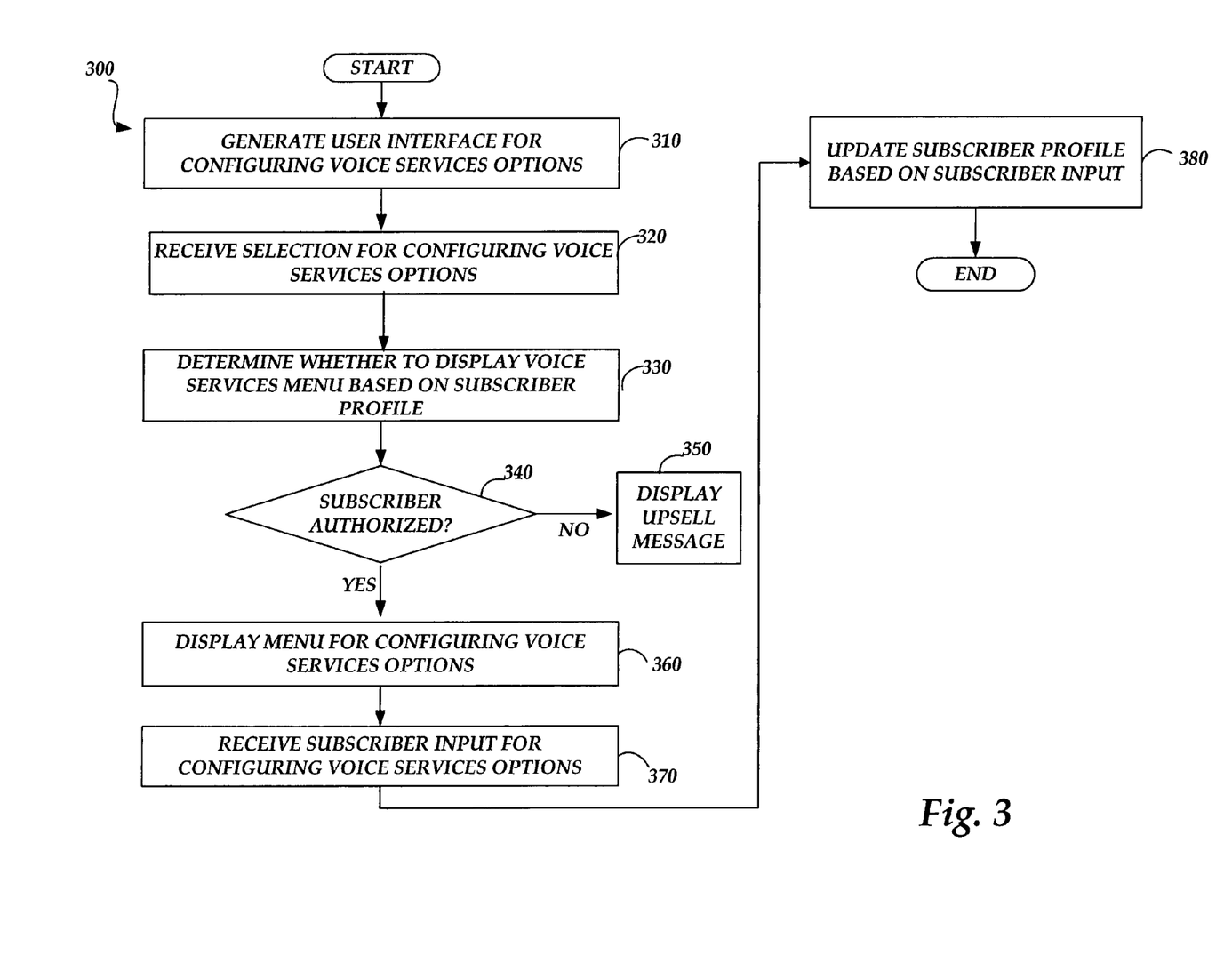
FIG. 3 is a flow diagram showing an illustrative routine for configuring the management of voice services in a cable television services system.

Referring now to FIG. 3, an illustrative routine 300 for configuring the management of voice services in the CATV system 2 will now be described. The routine 300 begins at operation 310, where the STB 120 is programmed to generate a user interface for configuring voice services options including settings and preferences (e.g., displaying a notification and/or disposition banner) as well as real-time disposition options (e.g., call forwarding). In particular, the user interface may comprise a user-selectable voice services icon which, when selected by a subscriber, directs the subscriber to a voice services menu for configuring the voice services options.

The routine 300 continues from operation 310 at operation 320 where a selection for configuring the voice services options in the voice services menu generated by the STB 120. The routine 300 then continues from operation 320 at operation 330 where the STB 120 determines whether to display the voice services menu based on a subscriber profile. In particular, after receiving the selection for configuring the voice services options in the voice services menu, the STB 120 may be configured to retrieve a subscriber profile in the manner discussed above with respect to FIG. 2 and determine if there are any subscribed features which will prevent the configuration of the voice services options. It will be appreciated that in addition to the data discussed above with respect to FIG. 2, the subscriber profile may also include data indicating subscribed features which may be provided by the CATV system 2. These features may include digital telephone service, Caller ID service, and "Privacy Manager" (e.g., for intercepting private calls, unwanted calls, and blocked calls that do not show a telephone number on a Caller ID display). Thus, for instance, if a subscriber is not a digital telephone subscriber with Caller ID service, the STB 120 will prevent the subscriber from accessing a menu for configuring options related to Caller ID. Furthermore, if a subscriber does subscribe to digital telephone service and Caller ID service but also subscribes to the Privacy Manager feature, the STB 120 will also prevent the subscriber from accessing a menu for configuring voice services options.

The routine 300 continues from operation 330 at operation 340 where, if the STB 120 determines that a subscriber is not authorized to configure voice services options (e.g., the subscriber does not subscribe to digital telephone or Caller ID services), then the STB 120 generates a message to the subscriber for display on the television 122. For instance, the message may be an "upsell" message to encourage the subscriber to subscribe to digital telephone service or Caller ID service. The message may also include a notification that a particular feature (such as Privacy Manager) prevents access to voice services options for managing incoming voice services. An illustrative television screen including a message to the subscriber in accordance with an embodiment of the invention will be described below with respect to FIG. 5.

If, however, at operation 330, the STB 120 determines that a subscriber is authorized to configure voice services options (e.g., the subscriber subscribes to digital telephone and Caller ID services), then a voice services menu is generated for configuring the voice services options for display on the television 122 at operation 360. The voice services menu may include a user interface for receiving subscriber inputs for configuring various voice services options (e.g., notification banner display and real-time call disposition). An illustrative user interface in accordance with an embodiment of the invention will be described below with respect to FIGS. 6-7.

The routine 300 continues from operation 360 at operation 370 where the STB 120 receives subscriber input for configuring voice services options. The routine 300 then continues from operation 370 at operation 380 where the STB 120 updates the subscriber profile based on the subscriber input for configuring the voice services options. In particular, the STB 120 may be configured to communicate a data message to the voice services application server 20 (through the proxy server 40) to update subscriber profile data in the Preferences database 92 after any voice services options are changed by the subscriber. For instance, if a subscriber changes the color of the voice services banner, the subscriber profile data is updated. The routine 300 then ends.

FIGS. 4-8 are diagrams illustrating various television screen displays and user interfaces generated by the STB 120 for configuring voice services options according to illustrative embodiments of the present invention. With respect to each of the FIGS. 4-8, a client application operating on the STB 120 may cause the presentation of a variety of user interfaces that are displayed to a subscriber on the television 122. It will be appreciated that user interfaces, menus, and banners illustrated in each of the television screen displays in FIGS. 4-8 are displayed along with video and playing audio from a television program broadcast in the cable television services system. The television program may be shown as either a full screen program or in a scaled video window. It should be understood that the layout and content of the television screen displays and user interfaces illustrated in FIGS. 4-8 are for purposes of example only and are not limiting of the variety of different layouts and types of content that may be included in such displays and user interfaces according to illustrative embodiments of the present invention.

Figure 4:
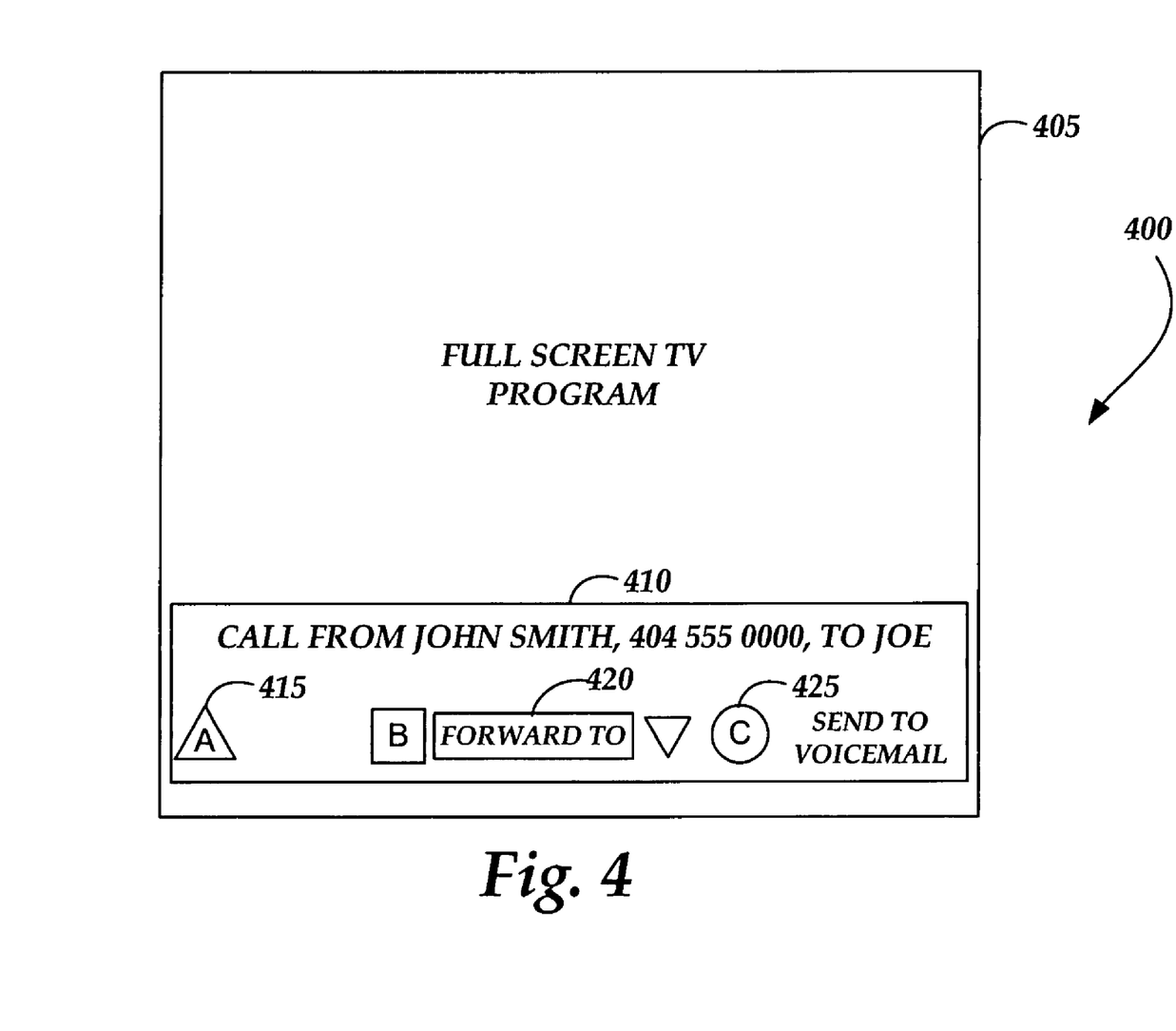
FIG. 4 is a diagram illustrating a voice services banner on a television screen display for disposing of an incoming voice service according to illustrative embodiments of the present invention.

Referring now to FIG. 4, the television screen display 400 includes a full screen television program 405 which is received from the head end 100 of the CATV system 2 on the STB 120. The disposition banner 410 includes a notification of an incoming telephone call to a subscriber including the name of the calling party, the telephone number of the calling party, and the name of the called party (i.e., the subscriber). The disposition banner 410 also includes selectable icons which the subscriber may select to dispose of an incoming telephone call. In particular, the icon A 420 may be selected to accept an incoming telephone call and the icon C 430 may be selected to send a call to voicemail. The disposition banner 410 also includes a dropdown button 425 from which a user may select from a list of alternate telephone numbers for forwarding the incoming telephone call.

Figure 5:
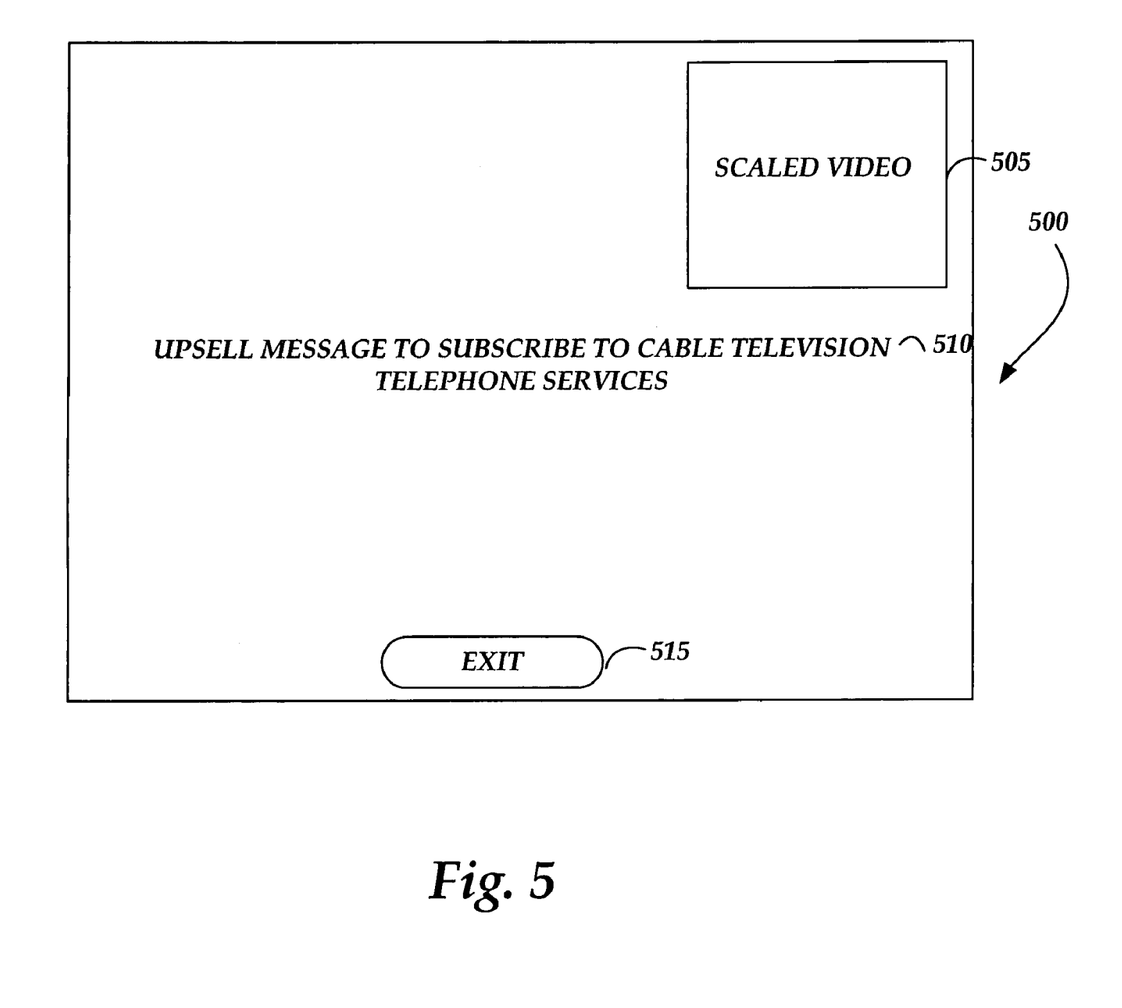
FIG. 5 is a diagram illustrating a message on a television screen display for notifying a cable television services subscriber to subscribe to voice services according to illustrative embodiments of the present invention.

Referring now to FIG. 5, the television screen display 500 includes a scaled video window 505 for showing a television program and an upsell message for subscribing to cable television telephone services. As discussed above with respect to FIG. 3, the television screen display 500 may be generated by the STB 120 in response to determining that a subscriber is not authorized to configure voice services options. The television screen display 500 also includes an "EXIT" button which may be selected by a subscriber to return to full screen television viewing.

Figure 6:
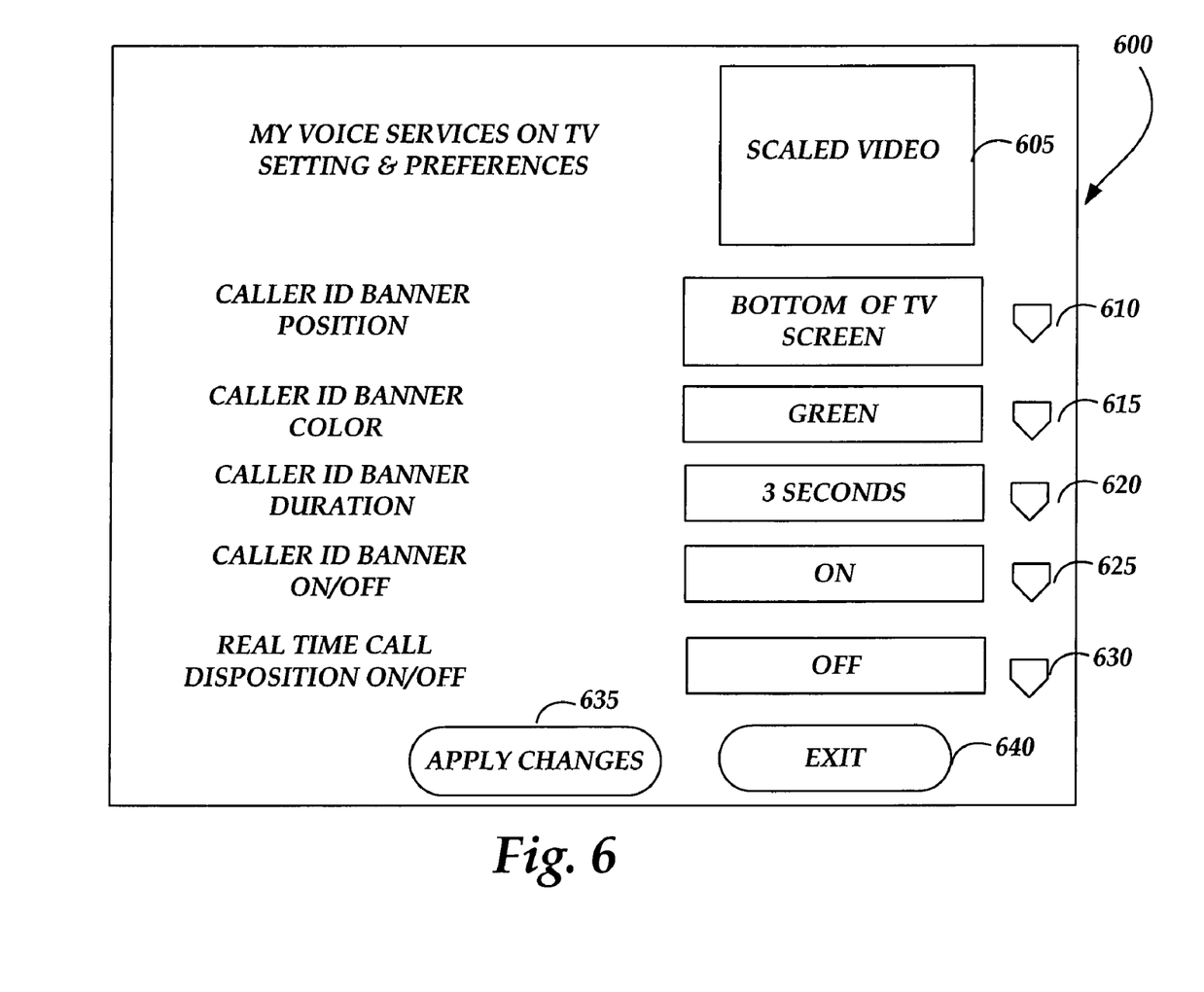
FIG. 6 is a diagram illustrating a user interface on a television screen display for configuring the management of voice services according to illustrative embodiments of the present invention.

Referring now to FIG. 6, a television screen display 600 for configuring voice services options is shown. It will be appreciated that the display 600 may be generated by a client application running on the STB 120 in response to selecting an option in a voice services menu as described above with respect to FIG. 3. In the display 600, a scaled video window 605 for showing a television program (including audio) which is received from the head end 100 of the CATV system 2 on the STB 120, is shown. The display 600 also includes drop-down menu icons 610, 615, 620, 625, and 630 which may be selected by a subscriber for configuring various voice services options.

In particular, drop-down menu icon 610 may be selected to select a position a voice services banner (i.e., a Caller ID banner) on the television display 122 when an incoming voice service is received. For instance, the voice services banner may be positioned at the bottom, top, bottom left corner, or bottom right corner, of the television display 122. In accordance with the various illustrative embodiments of the inventions, other screen positions may also be selected. Drop-down menu icon 615 may be selected to select a color of the voice services banner, drop-down menu icon 620 may be selected to select a duration that the voice services banner will appear on the television display 122, and the drop-down menu icon 625 may be selected for turning the voice services banner on or off. It should be understood that when the voice services banner is configured to be "off," the banner is not displayed when an incoming voice service is received. Drop-down menu icon 630 may be selected to turn real-time call disposition (i.e., answering or forwarding incoming voice services) on or off. It will be appreciated that turning on real-time call disposition causes the STB 120 to generate a voice services banner for disposing of incoming voice services such as the one shown in FIG. 4. It will further be appreciated that when real-time position is turned off, the STB 120 may generate a voice services banner that does not display disposition options (i.e., a notification banner) such as the one shown in FIG. 7. It should be understood that turning off the display of the voice services banner automatically turns off real-time call disposition and that turning the voice services banner on does not automatically turn on real time call disposition.

The display 600 also includes an "APPLY CHANGES" button 635 which may be selected to save any changes made to voice services options to the subscriber's profile as described above with respect to FIG. 3. Finally, the display 600 also includes an "EXIT" button 635 for exiting the display 600 (i.e., so that the subscriber may return to viewing a full screen television program).

Figure 7:
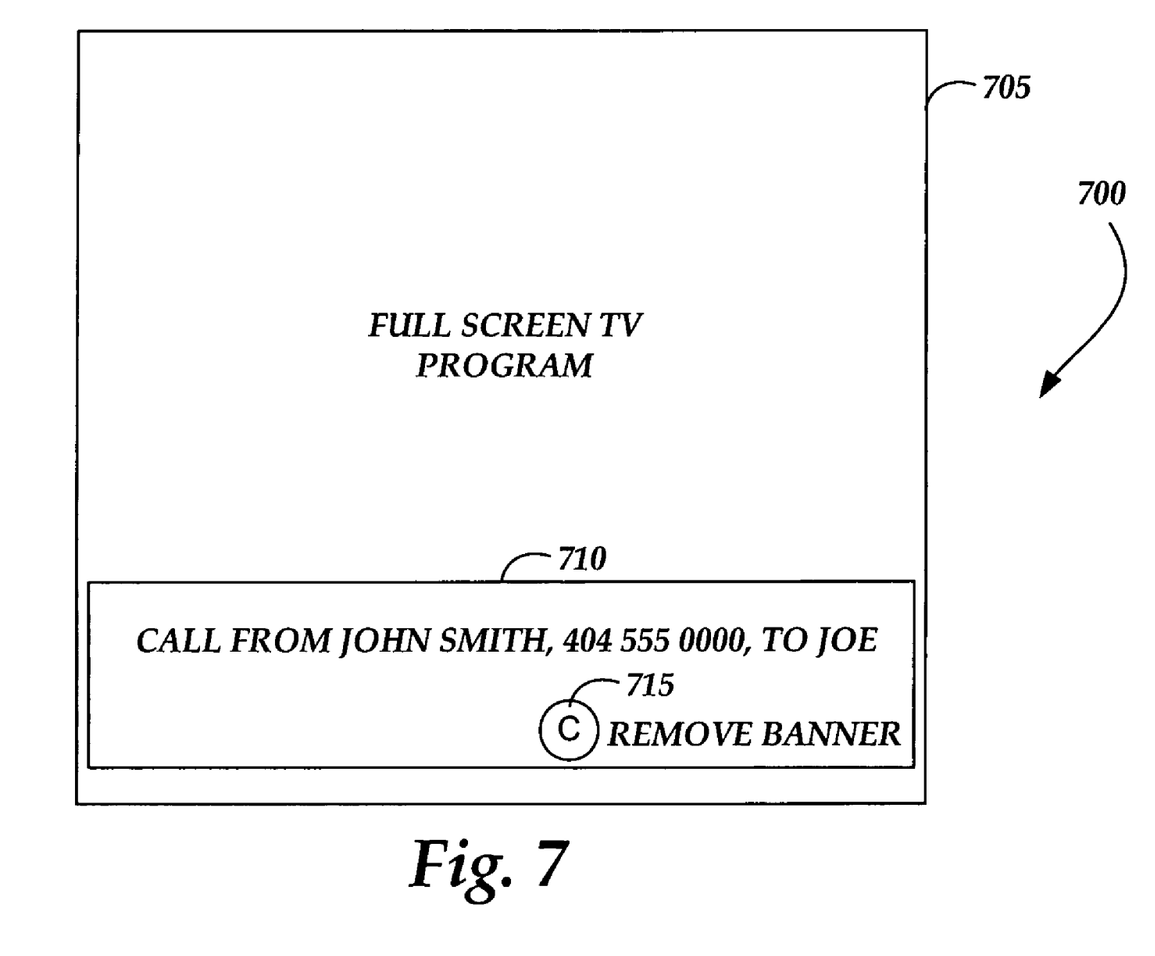
FIG. 7 is a diagram illustrating a voice services banner on a television screen display for notifying a subscriber of an incoming voice service according to illustrative embodiments of the present invention.

Referring now to FIG. 7, the television screen display 700 includes a full screen television program 705 which is received from the head end 100 of the CATV system 2 on the STB 120. The notification banner 710 includes a notification of an incoming telephone call to a subscriber including the name of the calling party, the telephone number of the calling party, and the name of the called party (i.e., the subscriber). The notification banner 710 also includes a selectable icon C 715 for removing the banner from the television display.

Figure 8:
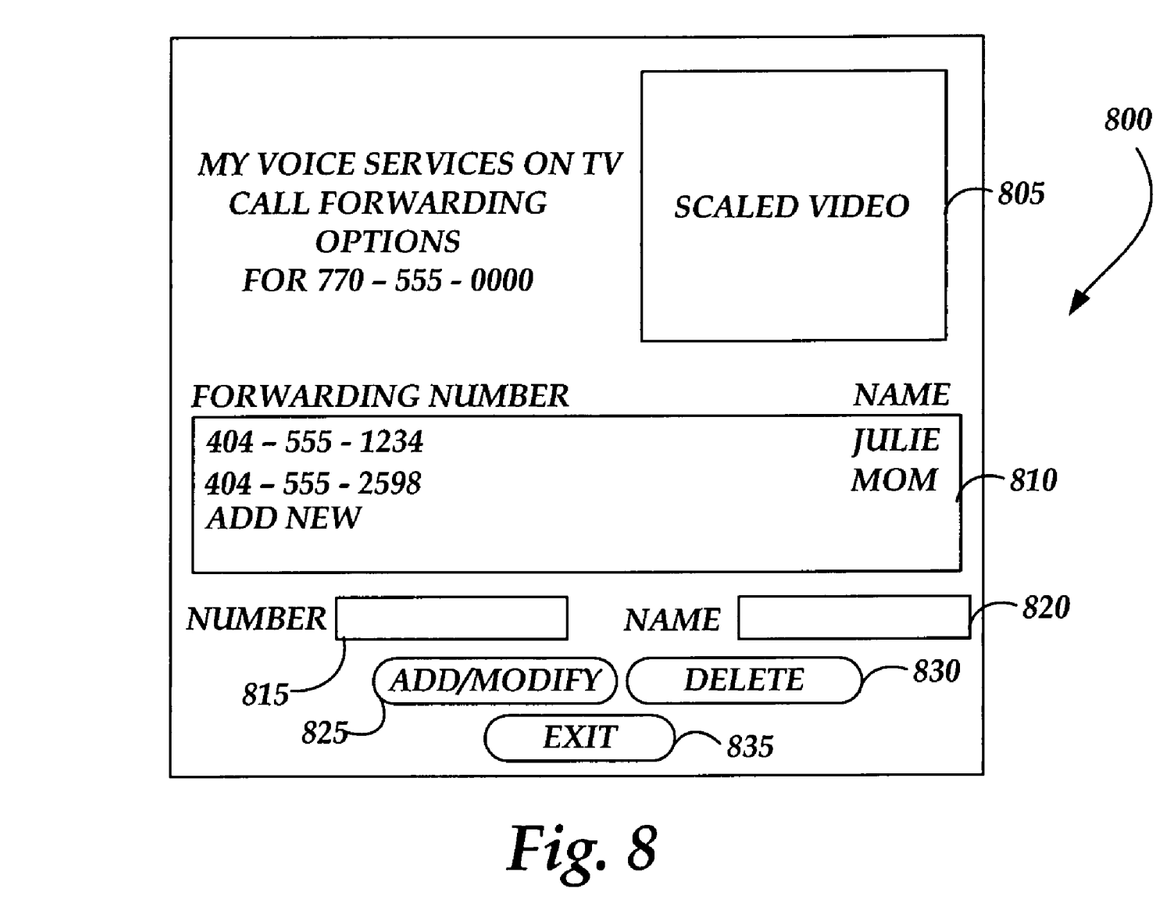
FIG. 8 is a diagram illustrating a user interface television screen display for managing configuring real-time call disposition for incoming voice services according to illustrative embodiments of the present invention.

Referring now to FIG. 8, a television screen display 800 for displaying call forwarding options for adding, deleting, or editing a list of forwarding numbers for incoming calls to a subscriber telephone number is shown. It will be appreciated that the display 800 may be generated by a client application running on the STB 120 in response to a menu selection by a subscriber for managing call forwarding options. In the display 800, a window 810 showing a current list of forwarding numbers and names is shown along with a scaled video window 805 for showing a television program (including audio) which is received from the head end 100 of the CATV system 2 on the STB 120. The display 800 also includes fill-in boxes 815 and 820 for entering new telephone numbers as well as names associated with each number, to the window 810 listing forwarding names and numbers. The display 800 also includes an "ADD/MODIFY" button 825 for adding the name and number information input into the boxes 815 and 820 or to modify existing forwarding information shown in the window 810. The display 800 also includes a "DELETE" button 830 for deleting entries in the window 810. Finally, the display 800 also includes an "EXIT" button 835 for exiting the display 800 (i.e., so that the subscriber may return to viewing a full screen television program).

Based on the foregoing, it should be appreciated that the various embodiments of the invention include a method and system for providing real-time notification and disposition of voice services in a cable television services system. The method and system enable a subscriber to receive real-time notification of incoming telephone calls on a set-top box and to issue disposition instructions for managing the incoming telephone calls. The disposition instructions may include answering a call, not answering a call, or forwarding a call to an alternate telephone number.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for managing voice services in a cable television services system, comprising:

providing, in storage remote to a user, a subscriber profile configured by the user for providing options for managing incoming voice services;

in response to receiving, in the cable television services system, a notification of an incoming voice service associated with a subscriber profile configured by the subscriber and maintained in storage remote to a subscriber, retrieving the pre-configured subscriber profile from the storage located remote to the subscriber, processing the incoming voice service according to the subscriber profile and generating a voice services banner with incoming voice service management options according to the subscriber profile maintained in the storage remote to the subscriber for routing to a set-top box at the subscriber for presentation to the subscriber; and processing the incoming voice service according to an option selected by the subscriber in the voice services banner.

2. The method of claim 1, wherein generating a voice services banner for displaying a plurality of options for managing the incoming voice service comprises generating a voice services banner for displaying an option to answer the incoming voice service.

3. The method of claim 1, wherein generating a voice services banner for displaying a plurality of options for managing the incoming voice service comprises generating a voices services banner for:

displaying an option for forwarding the incoming voice service to a pre-selected directory number; and displaying an option for forwarding the incoming voice service to a voice mailbox.

4. A method for configuring the management of voice services in a cable television services system, comprising:

generating an on-screen user interface on a display device in communication with a set-top box in the cable television services system for configuring voice services options for managing incoming voice services;

receiving in the user interface a selection for configuring the voice services options;

in response to receiving the selection, providing, in storage remote to a user, a subscriber profile configured by the user for managing incoming voice services and determining whether to display a menu for configuring the voice services options based on the subscriber profile; and if, based on the subscriber profile, it is determined that the configuration of voice services is authorized, then in response to receiving, in the cable television services system, a notification of an incoming voice service associated with a subscriber profile configured by the subscriber and maintained in storage remote to a subscriber, retrieving the pre-configured subscriber profile from the storage located remote to the subscriber, processing the incoming voice service according to the subscriber profile and generating a voice services banner with incoming voice service management options according to the subscriber profile maintained in the storage remote to the subscriber for routing to a set-top box at the subscriber for presentation to the subscriber; and processing the incoming voice service according to an option selected by the subscriber in the voice services banner.

5. The method of claim 4 further comprising, if based on the subscriber profile, it is determined that the configuration of voice services is not authorized, then displaying an upsell message for subscribing to voice services on the display device.

6. The method of claim 4 further comprising, in response to receiving a selection in the menu for configuring the voice services options, generating a user interface for configuring the display of a caller ID banner on the display device.

7. The method of claim 6, wherein generating a user interface for configuring the display of a caller ID banner on the display device comprises displaying a drop-down menu for configuring at least one of:

a position of the caller ID banner on the display device;

a color of the caller ID banner on the display device;

a duration value for displaying the caller ID banner on the display device; and a value for selecting whether to display the caller ID banner on the display device.

8. The method of claim 7, wherein generating a user interface for configuring the voice services options further comprises displaying a drop-down menu for activating real-time call disposition on the display device.

9. The method of claim 4 further comprising, in response to receiving a selection in the menu for configuring the voice services options, generating a user interface for configuring real-time call disposition on the display device.

10. The method of claim 4 further comprising:

receiving a subscriber input for configuring the voice services options; and updating the subscriber profile for the voice service options based on the subscriber input.

11. A computer-readable medium having computer-executable instructions stored thereon which, when executed by a computer, will cause the computer to perform a method for configuring the management of voice services in a cable television services system, comprising:

generating an on-screen user interface on a display device in communication with a set-top box in the cable television services system for configuring voice services options for managing incoming voice services;

receiving in the user interface a selection for configuring the voice services options;

in response to receiving the selection, providing, in storage remote to a user, a subscriber profile configured by the user for managing incoming voice services and determining whether to display a menu for configuring the voice services options based on the subscriber profile; and if, based on the subscriber profile, it is determined that the configuration of voice services is authorized, then in response to receiving, in the cable television services system, a notification of an incoming voice service associated with a subscriber profile configured by the subscriber and maintained in storage remote to a subscriber, retrieving the pre-configured subscriber profile from the storage located remote to the subscriber, processing the incoming voice service according to the subscriber profile and generating a voice services banner with incoming voice service management options according to the subscriber profile maintained in the storage remote to the subscriber for routing to a set-top box at the subscriber for presentation to the subscriber; and processing the incoming voice service according to an option selected by the subscriber in the voice services banner.

12. The computer-readable medium of claim 11 further comprising, if based on the subscriber profile, it is determined that the configuration of voice services is not authorized, then displaying an upsell message for subscribing to voice services on the display device.

13. The computer-readable medium of claim 11 further comprising, in response to receiving a selection in the menu for configuring the voice services options, generating a user interface for configuring the display of a caller ID banner on the display device.

14. The computer-readable medium of claim 13, wherein generating a user interface for configuring the display of a caller ID banner on the display device comprises displaying a drop-down menu for configuring at least one of:
   a position of the caller ID banner on the display device;
   a color of the caller ID banner on the display device;
   a duration value for displaying the caller ID banner on the display device; and
   a value for selecting whether to display the caller ID banner on the display device.

15. The computer-readable medium of claim 14, wherein generating a user interface for configuring the voice services options further comprises displaying a drop-down menu for activating real-time call disposition on the display device.

16. The computer-readable medium of claim 11 further comprising, in response to receiving a selection in the menu for configuring the voice services options, generating a user interface for configuring real-time call disposition on the display device.

17. The computer-readable medium of claim 11 further comprising:
   receiving a subscriber input for configuring the voice services options; and
   updating the subscriber profile for the voice service options based on the subscriber input.

* * * * *